United States Patent [19]

Davio et al.

[11] 4,293,922

[45] Oct. 6, 1981

[54] DEVICE FOR MULTIPLYING BINARY NUMBERS

[75] Inventors: Marc Davio; Gery J. A. Bioul, both of Brussels, Belgium

[73] Assignee: U.S. Philips Corporation, New York, N.Y.

[21] Appl. No.: 58,414

[22] Filed: Jul. 18, 1979

Related U.S. Application Data

[63] Continuation of Ser. No. 812,244, Jul. 1, 1977, abandoned.

[51] Int. Cl.$^3$ .............................................. G06F 7/52
[52] U.S. Cl. ................................................. 364/757
[58] Field of Search .............................. 364/757, 758

[56] References Cited

U.S. PATENT DOCUMENTS

| | | | |
|---|---|---|---|
| 3,752,971 | 8/1973 | Calhoun et al. | 364/758 |
| 3,795,880 | 3/1974 | Singh et al. | 364/758 |
| 3,814,924 | 6/1974 | Tate | 364/757 |
| 3,866,030 | 2/1975 | Baugh et al. | 364/757 |

*Primary Examiner*—David H. Malzahn
*Attorney, Agent, or Firm*—Thomas A. Briody; Robert T. Mayer; James J. Cannon, Jr.

[57] ABSTRACT

A fast, parallel operating device for multiplying binary coded numbers. The numbers are divided into groups of n bits of directly successive significance levels. Subsequently, all feasible combinations of one group of the first number and one group of the second number are formed, for each combination a partial product being formed in a first array of partial product forming devices. A partial product is preferably formed by a logic circuit which operates non-sequentially but exclusively combinatory, and which has a logical depth of only three gates. The partial products are subsequently applied to a second array of partial sum forming devices in which they are added together with intermediate partial sums, taking into account their relative significance levels. Together with the partial product digit of lowest significance, the final row of partial sum forming devices then generates, co-operating in parallel, the complete product. A corresponding method can be used for the multiplication of binary numbers in two's complement representation. In that case the product of the parts after the decimal point must be increased by the cross products of the parts before the decimal point and the inverted values of the parts of the two numbers after the decimal point. The part of the product before the decimal point is obtained by modulo-2 addition of the parts before the decimal point of the two number in two's complement representation itself.

15 Claims, 14 Drawing Figures

| $x_2 x_1 x_0$ | $y_2 y_1 y_0$ | $x_2 x_1 x_0$ | $n_2 n_1 n_0$ | $x_2 x_1 x_0$ | $y_2 y_1 y_0$ | $x_2 x_1 x_0$ | $n_2 n_1 n_0$ |
|---|---|---|---|---|---|---|---|
| 0 0 0 | 0 0 0 | 0 0 0 | 0 0 0 | 1 0 0 | 0 0 0 | 0 0 0 | 0 0 0 |
| 0 0 0 | 0 0 1 | 0 0 0 | 0 0 0 | 1 0 0 | 0 0 1 | 0 0 0 | 1 0 0 |
| 0 0 0 | 0 1 0 | 0 0 0 | 0 0 0 | 1 0 0 | 0 1 0 | 0 0 1 | 0 0 0 |
| 0 0 0 | 0 1 1 | 0 0 0 | 0 0 0 | 1 0 0 | 0 1 1 | 0 0 1 | 1 0 0 |
| 0 0 0 | 1 0 0 | 0 0 0 | 0 0 0 | 1 0 0 | 1 0 0 | 0 1 0 | 0 0 0 |
| 0 0 0 | 1 0 1 | 0 0 0 | 0 0 0 | 1 0 0 | 1 0 1 | 0 1 0 | 1 0 0 |
| 0 0 0 | 1 1 0 | 0 0 0 | 0 0 0 | 1 0 0 | 1 1 0 | 0 1 1 | 0 0 0 |
| 0 0 0 | 1 1 1 | 0 0 0 | 0 0 0 | 1 0 0 | 1 1 1 | 0 1 1 | 1 0 0 |
| 0 0 1 | 0 0 0 | 0 0 0 | 0 0 0 | 1 0 1 | 0 0 0 | 0 0 0 | 0 0 0 |
| 0 0 1 | 0 0 1 | 0 0 0 | 0 0 1 | 1 0 1 | 0 0 1 | 0 0 0 | 1 0 1 |
| 0 0 1 | 0 1 0 | 0 0 0 | 0 1 0 | 1 0 1 | 0 1 0 | 0 0 1 | 0 1 0 |
| 0 0 1 | 0 1 1 | 0 0 0 | 0 1 1 | 1 0 1 | 0 1 1 | 0 0 1 | 1 1 1 |
| 0 0 1 | 1 0 0 | 0 0 0 | 1 0 0 | 1 0 1 | 1 0 0 | 0 1 0 | 1 0 0 |
| 0 0 1 | 1 0 1 | 0 0 0 | 1 0 1 | 1 0 1 | 1 0 1 | 0 1 1 | 0 0 1 |
| 0 0 1 | 1 1 0 | 0 0 0 | 1 1 0 | 1 0 1 | 1 1 0 | 0 1 1 | 1 1 0 |
| 0 0 1 | 1 1 1 | 0 0 0 | 1 1 1 | 1 0 1 | 1 1 1 | 1 0 0 | 0 1 1 |
| 0 1 0 | 0 0 0 | 0 0 0 | 0 0 0 | 1 1 0 | 0 0 0 | 0 0 0 | 0 0 0 |
| 0 1 0 | 0 0 1 | 0 0 0 | 0 1 0 | 1 1 0 | 0 0 1 | 0 0 0 | 1 1 0 |
| 0 1 0 | 0 1 0 | 0 0 0 | 1 0 0 | 1 1 0 | 0 1 0 | 0 0 1 | 1 0 0 |
| 0 1 0 | 0 1 1 | 0 0 0 | 1 1 0 | 1 1 0 | 0 1 1 | 0 1 0 | 0 1 0 |
| 0 1 0 | 1 0 0 | 0 0 1 | 0 0 0 | 1 1 0 | 1 0 0 | 0 1 1 | 0 0 0 |
| 0 1 0 | 1 0 1 | 0 0 1 | 0 1 0 | 1 1 0 | 1 0 1 | 0 1 1 | 1 1 0 |
| 0 1 0 | 1 1 0 | 0 0 1 | 1 0 0 | 1 1 0 | 1 1 0 | 1 0 0 | 1 0 0 |
| 0 1 0 | 1 1 1 | 0 0 1 | 1 1 0 | 1 1 0 | 1 1 1 | 1 0 1 | 0 1 0 |
| 0 1 1 | 0 0 0 | 0 0 0 | 0 0 0 | 1 1 1 | 0 0 0 | 0 0 0 | 0 0 0 |
| 0 1 1 | 0 0 1 | 0 0 0 | 0 1 1 | 1 1 1 | 0 0 1 | 0 0 0 | 1 1 1 |
| 0 1 1 | 0 1 0 | 0 0 0 | 1 1 0 | 1 1 1 | 0 1 0 | 0 0 1 | 1 1 0 |
| 0 1 1 | 0 1 1 | 0 0 1 | 0 0 1 | 1 1 1 | 0 1 1 | 0 1 0 | 1 0 1 |
| 0 1 1 | 1 0 0 | 0 0 1 | 1 0 0 | 1 1 1 | 1 0 0 | 0 1 1 | 1 0 0 |
| 0 1 1 | 1 0 1 | 0 0 1 | 1 1 1 | 1 1 1 | 1 0 1 | 1 0 0 | 0 1 1 |
| 0 1 1 | 1 1 0 | 0 1 0 | 0 1 0 | 1 1 1 | 1 1 0 | 1 0 1 | 0 1 0 |
| 0 1 1 | 1 1 1 | 0 1 0 | 1 0 1 | 1 1 1 | 1 1 1 | 1 1 0 | 0 0 1 |

Fig. 8

$X_5 = x_2 x_0 y_2 y_1 y_0 \lor x_2 x_1 x_0 y_2 y_0 \lor x_2 x_1 y_2 y_1$ $X_4 = x_2 x_1 x_0 y_1 y_0 \lor x_2 x_1 y_1 y_0 (\overline{x_1 y_2}) \lor x_1 x_0 y_2 y_1 (\overline{x_2 y_1})$
$\quad \lor x_2 y_2 (\overline{x_0 y_0})(\overline{x_1 y_1}) \lor x_2 x_0 y_2 y_0 (\overline{x_1 y_2})(\overline{x_2 y_1})$ $X_3 = x_2 x_0 y_2 y_0 (\overline{x_1 y_2})(\overline{x_2 y_1}) \lor x_1 x_0 y_1 y_0 (\overline{x_2 y_1})(\overline{x_1 y_2})$
$\quad \lor x_2 y_1 (\overline{x_1 y_0})(\overline{x_1 y_2})(\overline{x_0 y_2}) \lor x_1 y_2 (\overline{x_0 y_1})(\overline{x_2 y_1})(\overline{x_2 y_0})$
$\quad \lor x_1 y_2 y_0 (\overline{x_0 y_0}) \lor x_2 x_0 y_1 (\overline{x_0 y_0})$ $X_2 = x_2 y_0 (\overline{x_0 y_2})(\overline{x_1 y_1}) \lor x_0 y_2 (\overline{x_2 y_0})(\overline{x_1 y_1}) \lor x_0 y_2 y_0 (\overline{x_2 y_0})$
$\quad \lor x_2 x_0 y_0 (\overline{x_0 y_2}) \lor x_1 y_1 (\overline{x_2 y_0})(\overline{x_0 y_2})(\overline{x_0 y_0})$ $X_1 = x_1 y_0 (\overline{x_0 y_1}) \lor x_0 y_1 (\overline{x_1 y_0})$ $X_0 = x_0 y_0$

Fig.9

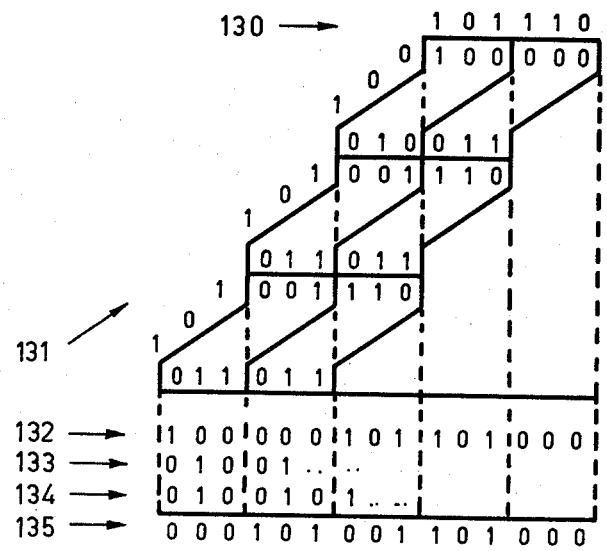

Fig.10

DEVICE FOR MULTIPLYING BINARY NUMBERS

This is a continuation, of application Ser. No. 812,244, filed JULY 1, 1977, now abandoned.

BACKGROUND OF THE INVENTION

1. Field of the Invention

The invention relates to a device for multiplying a first number, comprising a first plurality of m.n binary digits, by a second number comprising a second plurality of p.s binary digits. The device comprises a first array of partial product forming devices having inputs for receiving the first and second numbers and outputs connected to inputs of a sum forming device for transferring a third plurality of q partial products to the sum forming device. The sum forming device comprises means for forming a complete sum of the said q partial products with respect to their relative significance levels, the complete sum appearing on an output of the device for further use. In certain types of data processing systems there exists a substantial need for fast devices for performing multiplications on a multiplicand and a multiplier which may each consist of a large number of bits. Such a need may exist in a computer which is used for scientific purposes and which must perform a large number of successive multiplications in an iterating manner, or, multiplications between sets of quantities to be multiplied pair-wise. On the other hand, operations of this kind also occur in large computers for accounting purposes or in special purpose computers, such as computers for performing cross-correlations or auto-correlations on complex series of measurements. A further application can be found in digital transversal filters.

2. Description of the Prior Art

Generally, decimal multiplication is performed by the successive addition of performed multiples (1x ... 9x) of the multiplicand. Similarly, binary multiplication is usually performed by the successive shifting of the multiplicand relative to a developing preliminary product, while the values of the successive multiplier bits determine whether or not the multiplicand must be added to the preliminary product. It is known to speed up the multiplication by performing the operations in parallel. The article R. H. Larson, "Medium Speed Multiply", IBM Technical Disclosure Bulletin 16, (Dec. 1973), discloses a common bus having a capacity of four bits, being used for applying four multiplier bits in parallel. Consequently, the known device has a cyclic mode of operation which must be repeated a number of times for each complete multiplication. Moreover, the known device requires an adder involving complex propagation of the carry signals.

SUMMARY OF THE INVENTION

It is an object of the invention to provide a fast parallel-operating multiplier for binary coded numbers.

It is another object of the invention to provide such a multiplier requiring the use of only a limited number of logic gates.

It is yet another object of the invention to provide partial product forming devices which have only a small logical depth, expressed in a number of gate delay times, so that their operation is fast.

It is yet another object of the invention to provide an array of partial product forming devices of modular structure.

It is yet another object of the invention to combine an array of partial product forming devices with a second array of partial sum forming devices of modular and simple structure. It is yet another object of the invention to provide a binary multiplier device which is suitable for multiplying positive, binary coded numbers as well as for multiplying numbers in two's complement representation, which may be positive as well as negative.

It is yet another object of the invention to provide a device which generates the complete product parallel-wise.

It is yet another object of the invention to provide partial product forming devices which receive only a few binary digits of each of the numbers to be multiplied, in order to form a partial product which also comprises only a small number of binary digits.

It is another object of the invention to provide an attractive, modular, simple and fast device for the successive formation of partial products, partial sums and complete product, the modules operating on at least 2+2 bits and preferably on 3+3 bits each.

It is another object of the invention to provide a device of the above specified kind which is suitable for implementation in the form of a large-scale integrated circuit (LSI).

The objects in accordance with the invention are realized in that for s, n≧2, the first array comprises a plurality of q partial product forming devices, each of which comprises n+s inputs for simultaneously receiving numbers of n and s binary digits, respectively, of mutually directly successive significance levels of each of the first and the second plurality of binary digits, respectively, (n, s, and q are positive integers). Each partial product forming device furthermore comprises means for forming therefrom, by combinatorial gating, a partial product of n+s binary digits of mutually directly successive significance levels, q being at least equal to m×p. Each of the said m.n binary digits is applied to p partial product forming devices. Each of the p.s binary digits is applied to m partial product forming devices, so that all partial product forming devices receive different combinations of the groups. The sum forming device comprises a second array of a fourth plurality of r partial sum forming devices, each of which comprises inputs for simultaneously receiving two groups of j binary digits of mutually directly successive significance levels within each of the two groups. Both groups have corresponding significance levels and originate at least indirectly from at least two partial products. Each partial sum forming device comprises a further input for receiving, simultaneously with the groups, a binary output carry signal from a partial sum forming device of next-lower significance level, if applicable. Each partial sum forming device furthermore comprises j outputs for outputting a partial sum of the signals received by the partial sum forming device and a carry output for outputting, simultaneously therewith, a binary output carry signal to a partial sum forming device of next-higher significance level, if applicable. A final row of partial sum forming devices of the second array cooperates with the partial product forming device of lowest significance in order to form the complete product in parallel. The extremely modular character of the device in accordance with the invention makes it very suitable for realization by computer-aided design (CAD).

Preferably, s=n=j. The construction of the partial product forming devices will thus be symmetrical, and the modules can generally be attractively realized.

Each partial sum forming device preferably comprises two groups of n inputs each for receiving an equal number of binary digits. The groups of binary digits originate from two partial product forming devices, from two partial sum forming devices, or from one partial product forming device and one partial sum forming device. The connections between the partial sum forming devices are thus also realized in a modular manner.

The partial product forming device of lowest significance preferably directly supplies, on its n least-significant outputs, part of the complete product, together with the last row of partial sum forming device s. Thus, n-binary digits of the complete product are directly realized, whilst the other n binary digits of the output result of the least-significant partial product forming device are further processed in the array of partial sum forming devices.

Preferably, for $2 \leq p < m$ the value of r at least equals $2p \cdot m + p - m - 1$, and for $2 \leq p = m$ the value of r at least equals $2p^2 - 3$. This results in a balanced design and a comparatively limited number of partial sum forming devices.

The partial product forming devices preferably have a logical depth of three combinatory logic gates. Such a small logic depth ensures an extremely fast execution of the operations for generating the partial products.

The said second array preferably comprises sequences of partial sum forming devices having a greatest length of p+m partial sum forming devices. When the partial sum forming devices are partly included in a branching structure, the successive formation of the intermediary partial sums can also be quickly executed, without additional, complex steps being required.

Preferably, $3 \leq n \leq 4$. Both of these cases results in an effective device, because on the one hand fast operation of partial product forming devices and partial sum forming devices, in combination with their limited number, results in a high speed, whilst on the other hand the limited value of n continues to enable simple construction of the modules.

For multiplying two numbers in binary two's complement representation, the first array preferably comprises a number of q partial product forming devices for s, $n \geq 2$, each partial product forming device comprising n+s inputs for simultaneously receiving pluralities of n and s binary digits, respectively, of mutually directly successive significance levels of the said first and the second number of binary digits, respectively, and furthermore comprising means for each time forming therefrom, by combinatory logic operations, a partial product of n+s binary digits of mutually directly successive significance levels, each of the said m.n digits being applied to at least p partial product forming devices, each of the said p.s binary digits being applied to at least m partial product forming devices. All partial product forming devices receive mutually different combinations of groups of binary digits. The sum forming device comprises a second array of a fourth plurality of r partial sum forming devices, each of which comprises inputs for simultaneously receiving two groups of j binary digits of mutually successive significance levels, which correspond for each group. Each partial sum forming device furthermore comprises an input and an output for a binary carry signal and an output for outputting a partial sum of j binary digits. Means are provided for inputting the cross-wise products of the non-fractional parts of the one hand and the bit-wise inverted fractional parts on the other hand of the first and the second number, the second array and further adding means parallel-wise forming, on the basis of the partial products and cross-wise products, taking into account their significance levels, in an adding fashion and in cooperation with the partial product forming device of lowest significance, the complete product in binary two's complement representation. This application has the same advantages and favorable aspects as previously described. A device of this kind can be alternatively constructed for use in only one of the two cases, or under specific external control in either one of the two modes. In given cases the additional means for inputting the cross-wise products can even be dispensed with, i.e. if the input numbers are coded or recorded in accordance with the signed digit representation.

The second array and the further adding means are preferably constructed from corresponding modules. A further simplification is achieved by an elaboration of the modular principle. Preferably, a number of at least $(2p^2 + 2p - 3)$ of such modules are provided for $2 \leq p = m$. This results in a balanced design and a comparatively limited number of partial sum forming devices.

The second array and the further adding means are preferably combined to form a single array which thus comprises sequences of partial sum forming modules having a greatest length of p+m partial sum forming devices. The combination of the partial sum forming devices in a branching structure results in a device whose speed equals that of the previously described one. The fact that the operation is equally fast enables simplicity of control.

BRIEF DESCRIPTION OF THE DRAWINGS

Embodiments of the invention will be described in detail hereinafter by way of example with reference to the accompanying diagrammatic drawings in which:

FIG. 8 is a table of inputs and corresponding outputs applicable to the circuit of FIG. 7;

FIG. 9 lists the logic functions carried out by the circuit of FIG. 7;

FIG. 10 is a diagram showing how multiplication of two numbers represented in two's-complement notation can be carried out;

DESCRIPTION OF THE PREFERRED EMBODIMENTS

Figure 1:
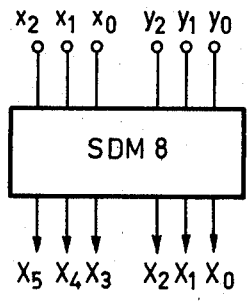
FIG. 1 is a block diagram of a partial product forming device.

FIG. 1 is a block diagram of a partial product forming device or unit SDM 8 for forming the product of a group of n digits and a group of s digits, where $n=s=3$. The unit has six inputs $x_2$, $x_1$, $x_0$ and $y_2$, $y_1$, $y_0$ for the two groups of three bits respectively. The significance levels decrease step-wise from $x_2$ to $x_1$ to $x_0$ and from $y_2$ to $y_1$ to $y_0$ (i.e. each time by a factor 2), but the relative significance levels of the two groups of three bits can be arbitrary. The unit also has six outputs for six binary output signals whose significance level decreases from $x_5$, to $x_4$ to $x_3$ to $x_2$ to $X_1$ to $X_0$. The absolute significance level of the output signals is determined by the combined significance levels of the input signals. The unit could of course have inputs for another number of input signals, for example four x-input signals and four y-input signals, in which case it would have outputs for eight X-output signals. Moreover, in certain cases an asymmetrical construction may be preferred, for example, the number of x-input signals may exceed the number of y-input signals by one. In that case an odd number of output signals would be generated.

Figure 2:
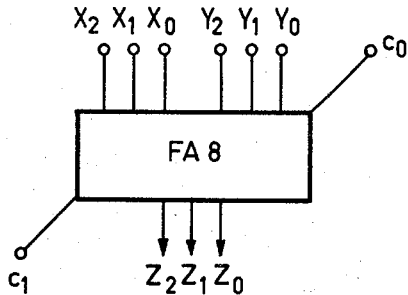
FIG. 2 is a block diagram of a partial sum forming unit.

FIG. 2 is a block diagram of a partial sum forming device or unit FA8 for forming the sum of a first group of j digits and a group of d digits, where $j=3$. The unit has an even number of six inputs $X_2$, $X_1$, $X_0$, $Y_2$, $Y_1$, $Y_0$, the inputs $X_2$ and $Y_2$ having corresponding significance levels and the significance levels in each series $X_2$-$X_0$ and $Y_2$-$Y_0$ decreasing by one step for each member of the series. The absolute significance level of the input signals is arbitrary. The unit FA 8 also has an input $C_0$ for a carry signal which may be generated, for example, by a partial sum forming unit of next-lower significance range. The unit has three outputs $Z_2$, $Z_1$, $Z_0$ which have successive significance levels, these levels decreasing by one step from $Z_2$ to $Z_1$, and from $Z_1$ to $Z_0$. The significance levels of the input $X_2$ and the output $Z_2$ correspond. The unit also has an output $C_1$ for a generated carry signal which can be applied, for example, to a partial sum forming unit of next-higher significance range. Integer adders of this kind are known per se and form part of arithmetical and logic units (ALU-units) in computers. Therefore, their internal construction will not be elaborated herein.

Figure 3:
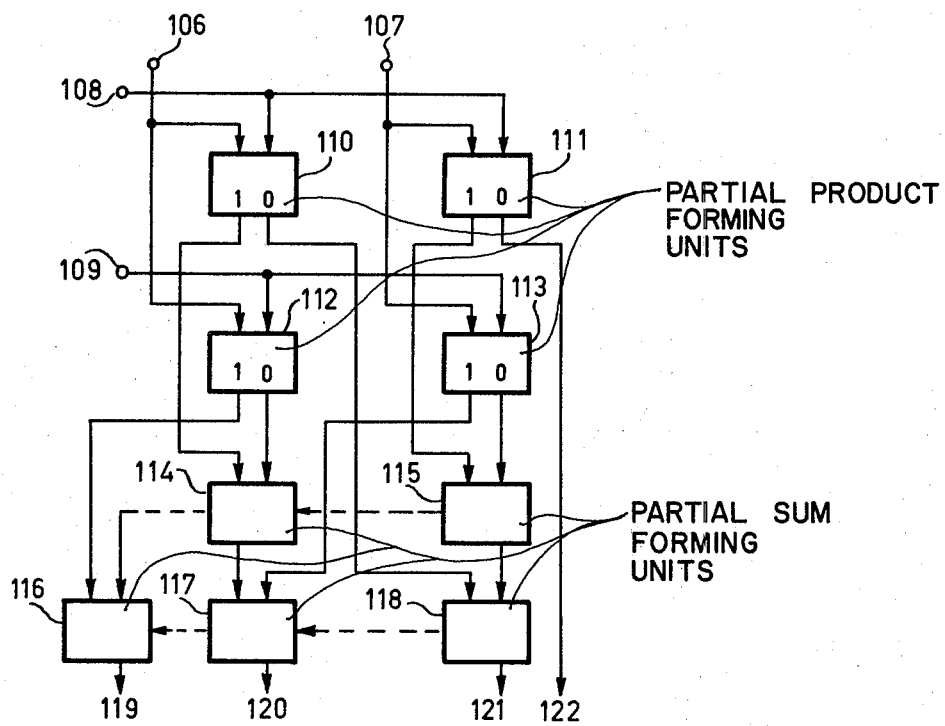
FIG. 3 is a simplified diagram of a first embodiment of the invention.

FIG. 3 shows an embodiment of the invention in the form of apparatus for multiplying together numbers comprising six bits each, groups each containing three bits being formed from the two numbers. The two groups of bits of the first number are received on the inputs 106 and 107 respectively, the input 106 receiving the three most-significant bits and the input 107 receiving the three least-significant bits. Similarly the second number is applied to the inputs 108 (least significant bits) and 109 (most significant bits). The various bits are thence applied to relevant partial product forming units 110 ... 113 each of which is as shown in FIG. 1. The unit 111 receives the least-significant digit groups of the two numbers. The units 110, 113 each receive the most-significant digit group of one of the two numbers and the least-significant digit group of the other number. The unit 112 receives the most-significant digit group of both numbers. Each of the partial product forming units generates a six-bit partial product in the form of two three-bit-digit groups, the most significant one of which appears on the "1" output while the least-significant one appears on the "0" output). Consequently, there are four successive significance ranges for the resulting output digit groups: (112-1); (112-0, 110-1, 113-1); (110-0, 113-0, 111-1); (111-0). The "0" output of the unit 111 produces the least-significant output digit group of the complete apparatus directly. The three digit groups of the next-higher significance range are added together in partial sum forming units 115, 118 each of which is as shown in FIG. 2, the latter unit receiving an intermediate sum from the former unit. These two units thus together form a three-input arithmetic member for generating a digit group on the output 121 and two carry signals of mutually the same significance level for use in the partial sum forming units 114, 117, each of which is also as shown in FIG. 2. (Non-interrupted lines are used to denote these conductors which transport three-bit digit groups, while those used for transporting one-bit carry signals are denoted by broken lines). Similarly, the three partial product digit groups of next-higher significance range generate, together with carry signals from the units 115, 118, a further output digit group on the output 120 and two further intermediate carry signals, partial sum forming units 114 and 117 also acting as a three-input arithmetic member. The signal on the "1"-output of the unit 112 is added to the two carry signals from units 114 and 117 in a partial sum forming unit 116 which is as shown in FIG. 2. One carry signal is applied to the bit input of lowest signficance within the second digit group input of unit 116, the two other bit inputs thereof always having the value "0". The other carry signal is applied to the carry signal input of the unit. The carry signal from the partial sum forming unit 116 is always "0", (because a product of two six-bit numbers can comprise only twelve bits). The digit groups of the complete sum appear in parallel on the outputs 119, 120, 121, 122. If desired the appearance of the complete sum can be synchronized with other signals, for example by including gates in the various outputs, which gates are supplied with an unblocking signal when required.

The overall delay time through the complete device equals the sum of the partial delay times incurred in one partial product forming unit (because these units are all connected in parallel) and in four partial sum forming units, for example the series 115, 118, 117, 116 in which the next unit receives a result from the preceding unit. If the first input number comprises more digit groups than two, only the column containing the units 110, 112, 114, 117 need then be duplicated a number of times equal to the number of extra groups, the unit 116 always generating the most significant digit group of the output number.

Similarly, the apparatus shown in FIG. 3 can be modified to operate on input numbers containing digit groups of unequal length. For example, if $n=4$ and $s=2$, the connection pattern of the inputs of the partial product forming units 110–113 may be modified so that each of the inputs 106, 107 now transports four bit signals, while each of the inputs 108, 109 transports two bit signals. The internal structure of the partial product forming units will obviously also have to be modified accordingly. In fact the configuration of the partial sum forming units will also have to slightly modified, because the four partial products of six bits each now obtained will have significance ranges which are staggered over only two bits with respect to each other. Thus partial sum forming units can in this case be provided to form the partial sums of the groups of two digits which have the same significance ranges, respectively, to give the complete sum. The apparatus can be modified in a corresponding manner to deal with other cases where the sum of s and n is even.

The groups of digits produced by the partial product forming units need not, of course, each be transferred in one piece to a single partial sum forming unit, but may as an alternative be split up and distributed between a plurality of partial sum forming units in accordance with their respective significance levels.

It is, of course, alternatively possible for a partial sum forming unit to receive a number of bits which differs from the number generated by a partial product forming unit. For example, each of the partial sum forming units 114, 115, 117, 118 of FIG. 3 could operate on 2×4 input bits, the partial sum forming unit 116 then being replaced by a logic OR-gate having three inputs, connected to the most significant bit output of unit 112, and the carry outputs of units 114 and 117 respectively, because the most significant bit of the complete product can be 0 or 1 and no output carry occurs thereabove (see above). The values of s, n and j may thus be mutually different.

Figure 4:
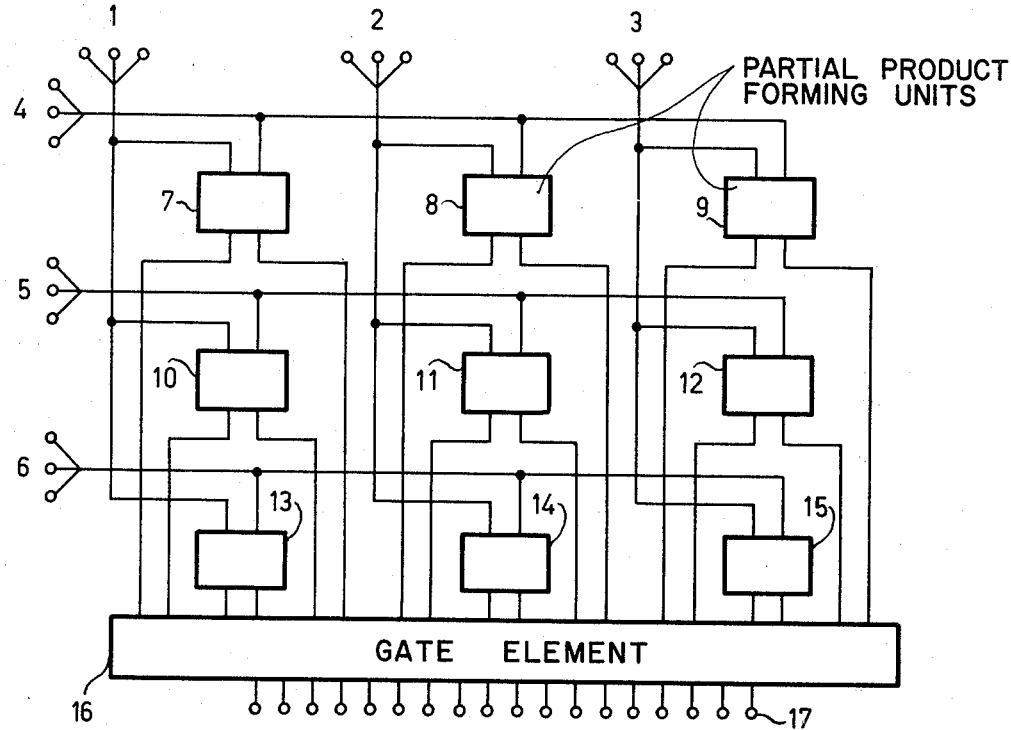
FIG. 4 shows an array of partial product forming units.

FIG. 4 shows an array of 3×3 partial product forming units for processing a pair of numbers each having three groups of digits. The input digit groups of, for example, three bits each are received on individual inputs 1-6, each possible combination of one input digit group from each of the two input numbers (1-3, 4-6, respectively) being simultaneously applied to the corresponding one of the nine partial product forming units 7-15. The partial products, nine in total, of six bits each are transmitted by a gate element 16 under the control of a synchronization signal (not shown) When this occurs the eighteen resulting groups of three digits appear on the outputs 17. If one of the input numbers always has less than 9 bits, the corresponding outputs can of course be omitted, either on the most significant side or on the least significant side. The array shown may be extended to accommodate more digit groups for each input number simply by increasing the number of rows and/or columns accordingly.

Figure 5:
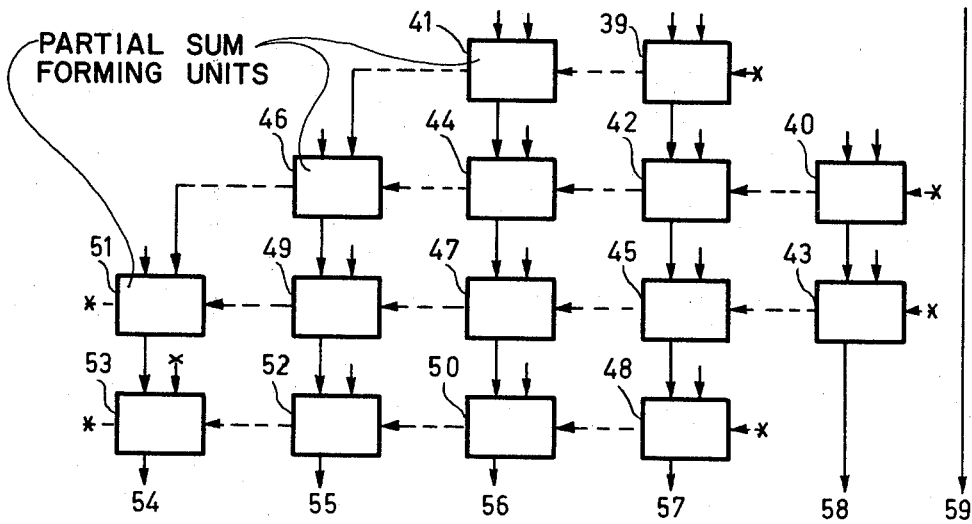
FIG. 5 shows an array of partial sum forming units, which, together with the array of FIG. 4, constitute as second embodiment of the invention.

FIG. 5 shows an array of partial sum forming units for use with the array of FIG. 4. The digit groups, eighteen in total, generated by the array of FIG. 4 are received on these inputs of the partial sum forming units 51, 46, 49, 52, 41, 44, 47, 50, 39, 42, 45, 48, 40, 43 which are denoted by the unlinked arrows and on the through line 59 respectively, the last being supplied with the partial product digit group of lowest significance range. The partial sum forming unit 53 is not supplied with a partial product digit group. The various columns of partial sum forming units are thus supplied with 1, 3, 5, 5 and 3 partial product digit groups of the same significance range, respectively, plus, if applicable, carry signals from the column corresponding to the next-lower significance range (The columns from left to right correspond to increasing significance ranges) Uninterrupted lines symbolize conductors for three bits, interrupted lines symbolize conductors for a one-bit carry signal. Inputs denoted by a cross are not used. Fifteen partial sum forming units are required in all in this case: 2+4+4+3+2=15.

Figures 12, 13, 14:
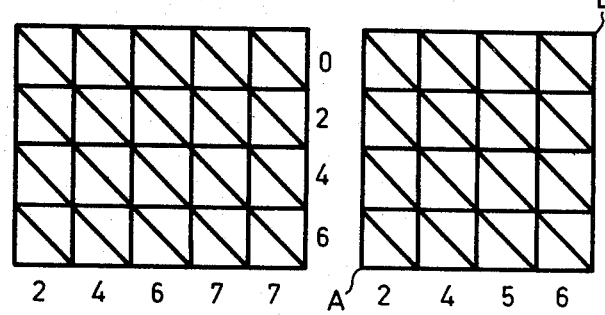
FIG. 12 is a diagram showing how partial products have to be summed in a particular case.
FIG. 13 is another diagram showing how partial products have to be summed in a particular case.
FIG. 14 is yet another diagram showing how partial products have to be summed in a particular case.

FIG. 13 is a diagram of how the partial products would have to be added if both input numbers were to comprise four digit groups (for example, of three bits each). Each column and each row correspond to one such digit group and hence each component square corresponds to a partial sum of six bits in this case. The three-bit digit groups of the same significance of the various partial sums are added together, the digit groups of the same significance lying along a corresponding diagonal the significance of which increases from B to A. Each triangle on each diagonal thus corresponds to a three-bit digit group to be added to the others in that diagonal. The required number of partial sum forming units is stated for each diagonal, this number being one less than the number of triangles plus any additional partial sum forming units required to propagate carry signals from lower to higher significance levels. In general, the number of partial sum forming units required when the numbers of digit groups in each input number are p and m respectively and where p=m is $2+4+ \ldots +(2p-2)+(2p-2)+(2p-3)+(2p-4)+ \ldots +4+2=2p^2-3$. For p=3, this results in 15 units; for p=4, 29 units are required.

FIG. 12 is a diagram corresponding to FIG. 13, but for the case p=4, m=5.

With p<m the number of partial sum forming units required is: $0+2+4+ \ldots +(2p-2)+(2p-1)+ \ldots +(2p\cdot1)\cdot(m-p)+(2p-2)+(2p-4)+ \ldots 4+2=2p\,m+p-m-1$.

It should be noted that at least b−1 partial sum forming units are always required: for the addition of a number b of digit groups; if there are more than b−1 carry signals to a given significance level, even more partial sum forming units are required at that level.

Figure 6:
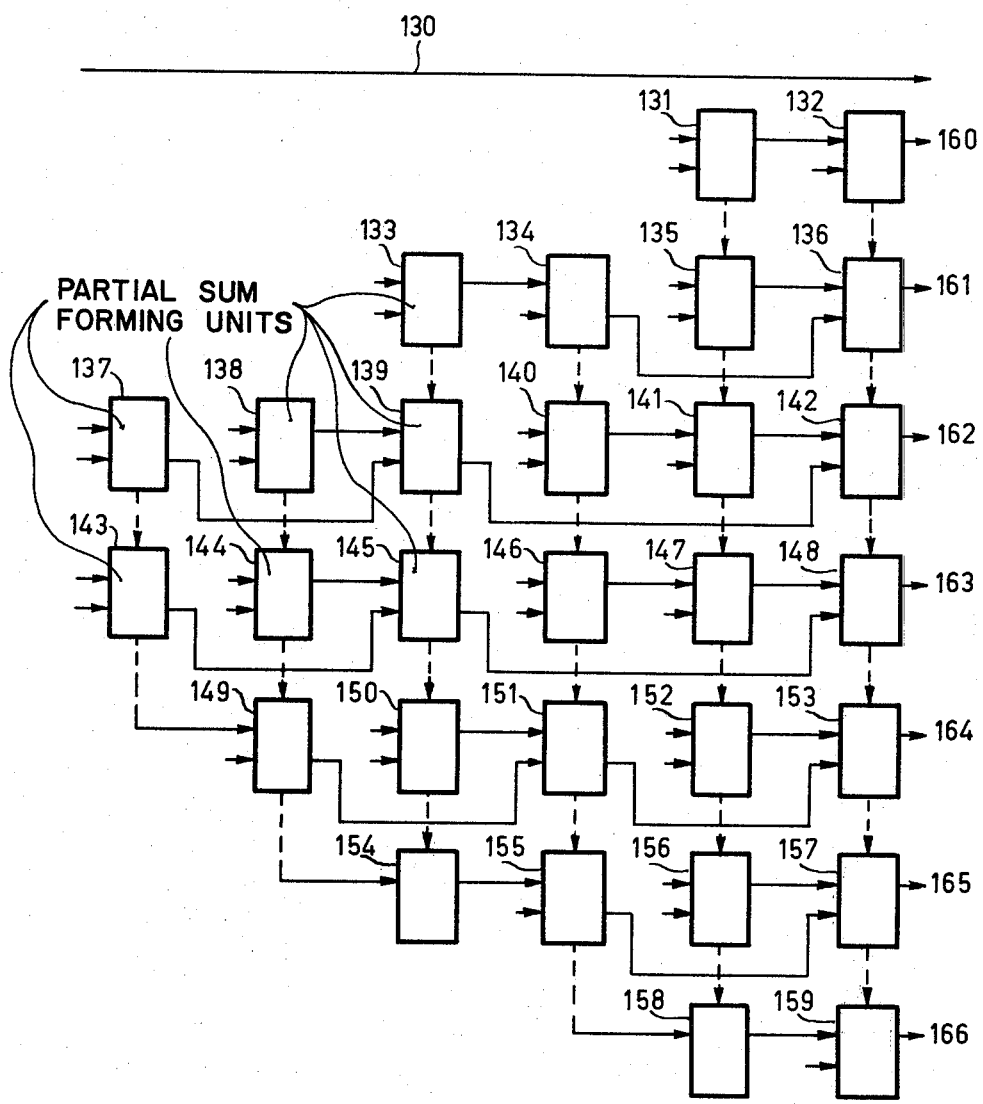
FIG. 6 shows another array of partial sum forming units.

FIG. 6 shows an array of partial sum forming units which is similar to that of FIG. 5 but for p=m=4 (FIG. 13). The various inputs have been regrouped slightly within each column of partial sum forming units. The partial product digit group of lowest significance range is transferred directly along the line 130. The column of next-higher significance range comprises two partial sum forming units 131, 132 and receives three partial product digit groups on the inputs denoted by arrows and generates one digit group on the output 160. The column of next-higher significance range comprises four partial sum forming units 133-136. It receives five partial product digit groups and generates one digit group on the output 161. The outputs of the partial sum forming units 134, 135 are connected in parallel to the inputs of the unit 136. The column of next-higher significance range comprises six partial sum forming units 137-142. It receives seven partial product digit groups and generates one digit group on the output 162. The outputs of the pairs of partial sum forming units 137/138 and 139/141 are connected in parallel to the inputs of the partial sum forming units 139 and 142, respectively. The columns of higher significance range are similarly organized. With this organization, the number of partial sum forming units connected in series in each column containing more than two units is reduced, reducing the maximum signal delay produced. The maximum length of a chain of units is eight in FIG. 6, for example, the chain 131, 132, 136, 142, 148, 153, 157, 159. In fact this maximum length is p+m, i.e. 2p for p=m. The organization within the various columns can always be made such that the delay of the signals within a given column never exceeds that present at the final unit of the column of next lower significance range, increased by one unit.

Figure 7:
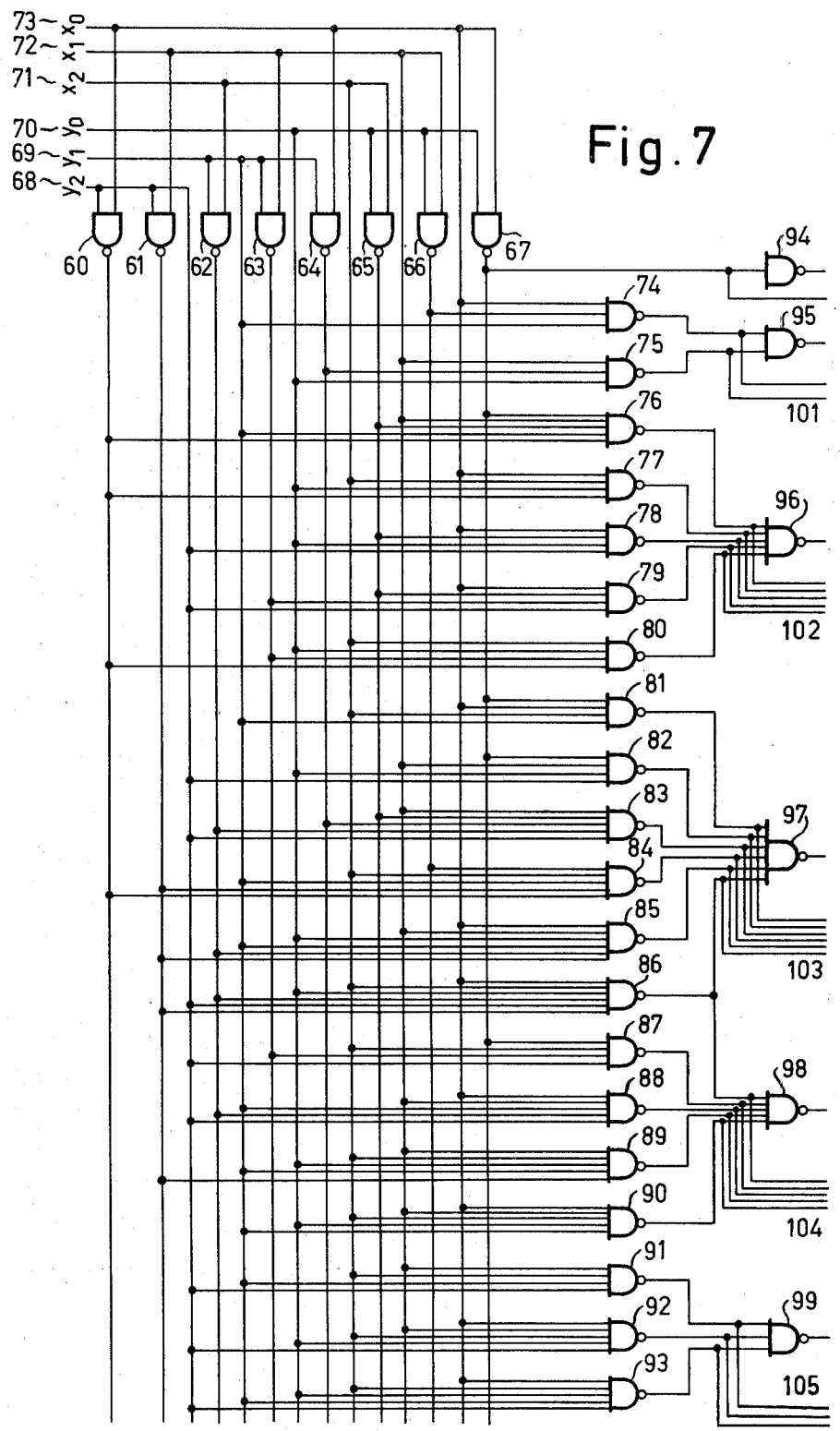
FIG. 7 is a detailed circuit diagram of a partial product forming unit.

FIG. 7 shows a possible detailed construction for a partial product forming unit for forming the partial product of two groups of three bits and which consists entirely of logic NAND-gates. The first digit group is received on the inputs 68-70, the first one of which receives the most significant bit and so on, and the second digit group is received on the inputs 71-73, the first one of which receives the most significant bit and so on.

The unit of FIG. 7 comprises a first level of eight input NAND-gates 60-67 which form all combinations of an input of the first digit group and an input of the second digit group (except for the combination of the inputs 68 and 71). A second level of twenty NAND-gates 74-93 forms various output signals from the output signals of the first level of NAND-gates and the input signals. The outputs of the second level are combined in groups by six NAND-gates 94-99 of a third level, each of which produces one of the six output bit signals. The single or multiple outputs 100-105 which correspond to the input lines of the corresponding output gates are alternatives to the outputs of the output gates, and each forms in combination the inverted value of the relevant output bit. They may be used if the output bits are required to be fed to another level of NAND-gates.

FIG. 8 shows the six-bit partial products, produced as a function of the values of the two input groups, and FIG. 9 shows the logic functions employed in the formation of each of the six partial product bits. The expressions between brackets are formed by the first level of NAND-gates. If each input group consisted of four bit signals the table of FIG. 8 would be merely the lower half of the associated table, bit signals of higher significance being omitted. With four-bit groups the highest partial product realized would be $1111 \times 1111 = 11100001$ ($15 \times 15 = 225$). The circuit can of course be modified to process input numbers made up from digit groups of unequal length.

It has been assumed that products are formed between positive numbers. The general multiplication of both positive and negative numbers, utilizing a device written in the two's complement representation can, however, also be carried out in the manner to be described. The "two's complement representation", is defined as follows: a fractional number having a value in the range: $-1 \leq A \leq 1 - 2^{-j}$ (j arbitrary) can be represented by a series of j binary coefficients of successively decreasing significance level in accordance with:

$A \sim (a0, a1, a2 ... aj)$, where $A = a0 + \sum_{i=1}^{j} ai/2^{-i}$.

For example, $\frac{5}{8}$ is represented as (0, 101) and $-\frac{5}{8}$ as (1, 101). The representation thus consists of two parts, i.e. a most significant bit which represents the sign of the number, while the combination of the most significant bit before the fractional point and the less significant bits after the fractional point represent the value of the number. For the multiplication of two numbers A, B, the most significant bit of the product is then given as $a_0 \oplus b_0$, the symbol $\oplus$ indicating the EXCLUSIVE-OR function or the modulo-2 addition. Subsequently, the product of the parts behind the fractional point of the numbers A and B is calculated as if positive numbers are concerned. Thirdly, the result is increased by the two quantities $a_0B^*$ and $b_0A^*$, carry signals of the parts behind the fractional point to parts before the fractional point being ignored (consequently, the circuit does not include a relevant connection). In this case A*, B* are the parts after the decimal point of $-A$ and $-B$, respectively, in two's complement representation. This is because, if A and B are both $\geq 0$, the previously described algorithm is similarly applicable. However, if $A < 0$ and $B \geq 0$, the values of the parts after the decimal point are equal to the positive numbers $(1 - |A|)$ and (B), respectively, the vertical strokes indicating the absolute values and the result of the non-corrected multiplication thus equals: $|B| - |A \cdot B|$. The value of the correction term is $1 - |B|$ in this case so that the corrected result of the multiplication equals $1 - |A \cdot B|$, no carry being allowed to the bit before the point. $1 - |A \cdot B|$ is the part required behind the point for the correct representation of the negative product A·B. If $B < 0$ and $A \geq 0$, a similar correction factor, this time employing A*, is required. If $A < 0$ and $B < 0$, the uncorrected multiplication result is $(1 - |A|) \cdot (1 - |B|)$. The correction terms are $|A|$ and $|B|$, respectively in this case, and the ultimate result $1 + |AB|$ (in fact $|AB|$ because the carry signal is not propagated) which is the part required after the point for the correct representation of the positive product A·B.

FIG. 10 is a diagram of an example of the multiplication together of two numbers A and B in two's complement representation, i.e. $A = -9/32$ (1.10111) and $B = -37/128$ (1.1011011). The partial product forming units each act on $3+3$ bits in order to form individual results each of which is chosen in one of the more or less parallelogram-shaped regions. The digits of the number A are shown with decreasing significance along the direction denoted by the arrow 131, the digits of the number B being shown similarly along the direction denoted by the arrow 130, the bits before the point having been omitted. The three most significant bits of each partial product are shown in the left of the vertical broken lines dividing the corresponding "parallelogram", while its three least significant bits are shown to the right of said line. The partial products in each column are added together to form the sum shown on the line 132. The line 133 shows $a_0B^*$ as previously defined and hence comprises a "1" wherever B contains a "0" and vice versa, except for the position of the least significant "1" in B and the positions of even less significant zeroes therein, where the digits equal those of B. Similarly, the line 134 contains the number $b_0A^*$ as previously defined. The contents of the lines 132, 133, 134 are added together to form the ultimate result on the line 135. The formation of the bit before the point in the product is not included in FIG. 10.

FIG. 14 is a diagram corresponding to FIGS. 12, 13 showing how various quantities can be combined to form the product of both positive and negative numbers, for the case $p = m = 3$. The non-shaded parts of the Figure correspond to the quantities required when only positive numbers are being dealt with, as described earlier. The six shaded triangles relate to the digit groups $a_0 \cdot \bar{B}_2, a_0\bar{B}_1, a_0\bar{B}_0, b_0\bar{A}_2, b_0\bar{A}_1, b_0\bar{A}_0$, respectively, which have been appended to the appropriate rows/columns. Therein, the bars indicated the inverted values and the significance of the groups $A_2 ... A_0$ and $B_2 ...$ $B_0$ decrease in this order. The bits $a_o$ and $b_o$ are the sign bits before the respective points in the numbers A and B. The further triangles in broken lines refer only to the sign bits $a_o, b_o$, respectively. The latter are added at the fourth significance level to form the two's complements from the inverted values where appropriate. The correction ultimately obtained is the same as that obtained when the quantities $a_o.B^*$ and $b_o.A^*$ are used directly. A final triangle in broken lines in the lower left hand corner of the figure symbolizes the Exclusive-OR-function of the two sign bits. The Exclusive-OR-function is realized in known ways by combinatorial gating. The product of the quantities like $a_o.B^*$ is realized by parallel gating of the respective bits of $B^*$ under common control of bit $a_o$ (for example by way of a like series of AND-gates). The transform from the fractional part of A to $A^*$ is done by inverting all bits down to the least-significant one-bit. The latter is not inverted, as neither are bits of even lesser significance. Inversion in a simple way is performed by gating the inverted output value of a storage register instead of gating the noninverted output.

Figure 11:
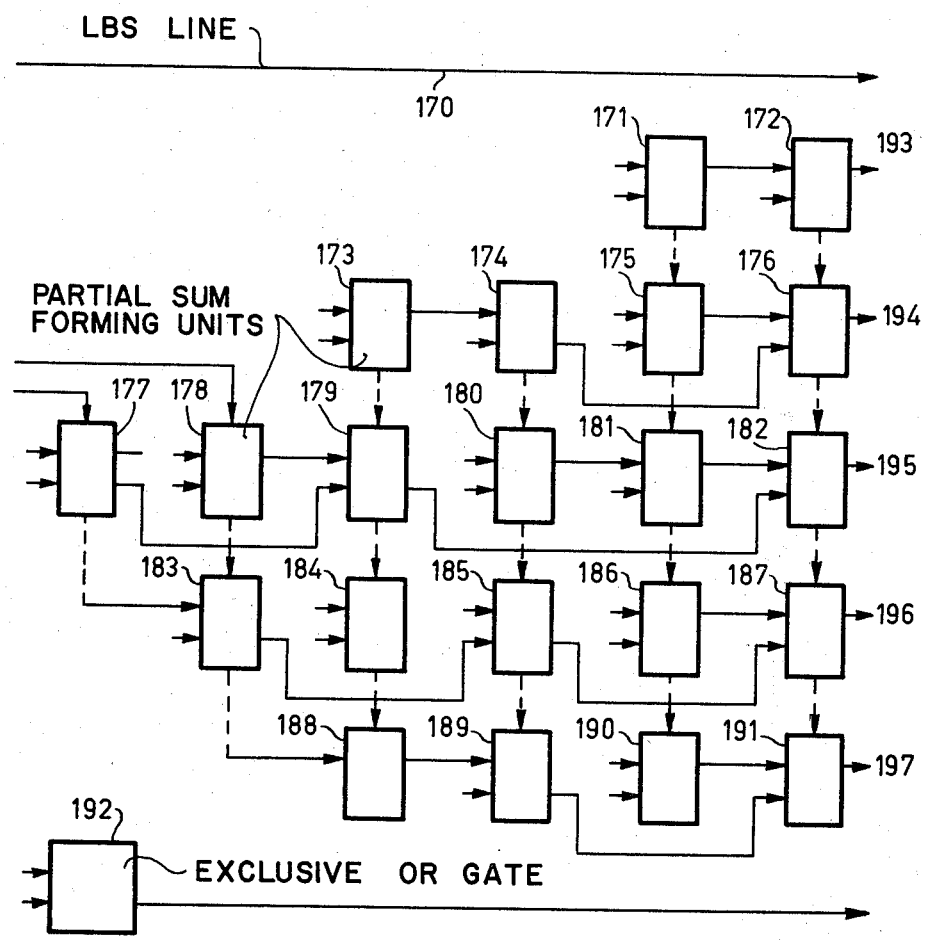
FIG. 11 shows an array of partial sum forming units for achieving some of the operations listed in FIG. 10.

In FIG. 11, the three least significant diagonals require, 0, 2 and 4 partial sum forming units, respectively. The next diagonal requires six units, the next five and the next four. (The quantities $a_o$ and $b_o$ can be added by means of carry inputs of units already present. In general, for p=m, 0+2+4+ . . . +(2p−2)+(2p)+(2p−1)+(2p−2)+(2p−4)+(20−b−)+ . . . +4=$2p^2+2p-3$ units are required in total. The number of partial sum forming units required when p<m can be calculated in a similar way.

FIG. 11 shows an array of partial sum forming units which is similar to that shown in FIG. 6, but in this case for p=m=3, and for processing both positive and negative numbers in the manner set out in FIG. 13, regrouping in order to reduce the delay of the signals again having been performed. In FIG. 11 this delay is determined by the series of partial sum forming units 171, 172, 176, 182, 187, 191 so that the same delay p+m occurs as previously. The least significant digit group of the complete product is transported by the line 170. The other digit groups appear on the outputs 193-197. Besides two partial products and/or products as described of the form $a_0.\overline{B}_o$, $b_0.\overline{A}_o$ the unit 177 also receives the bit $b_0$, and the unit 178 also receives the bit $a_0$; in both cases these bits are received on the corresponding carry input which is not used otherwise. This is indicated by additional arrows. The unit 192 generates the EXCLUSIVE-OR function of the signals $a_0$, $b_0$ which are applied thereto. The complete two's complement product has thus been generated, without it being necessary to introduce further sum forming units which would introduce additional delay. If both numbers to be multiplied are positive, the units 177, 178, 183, 184, 188, 189, 192 can be omitted or be deactivated by a special control signal. If the additional control is not provided, the output signal of the latter units will be automatically equal to zero in any case in the case of multiplication of two positive numbers. It is often advantageous to actually deactivate unused units by an additional signal in order to minimize the delay. For example, if one of the numbers applied to the product-forming circuit which feeds the array shown in FIG. 6 comprises less than four digit groups the corresponding units in FIG. 6 are preferably deactivated.

It is in fact possible, and in some cases it is attractive, to omit the additional sum-forming units which have been described as being necessary for the multiplication of positive and negative numbers such as the units 177, 178, 183, 184, 188, 189 in FIG. 11. This can be done if the signed digit representation is used. The two's complement representation of the number A is then divided into groups of z bits according to:

$$A = a_0, a_1 \ldots a_{(Z-1)} | a_z \ldots a_{(2z-1)} | \ldots$$

This formula is used to calculate:

$$c_i = -a(zi) + \sum_{j=1}^{z-1} [a(zi + j)2^{-j} + a\{a(zi + 1)\}2^{-z+1}].$$

Therein, the value of z is chosen in advance and determines the form of $c_i$. It has been found that $$A = \sum_{i=0}^{\infty} c_i \cdot 2^{-zi}.$$

it being necessary to sum all relevant bits, i.e. over as many groups of z bits as the original representation contains significant information. It has been found that, as a result of this symmetrical expression, this representation can be applied directly to the partial product forming devices. Notably the assembly of the partial sum forming devices can then remain unmodified.

What is claimed is:

1. A device for multiplying a first number having a first plurality of m groups, by a second number having a second plurality of p groups of binary digits, each of said groups consisting of n digits, of corresponding directly successive significance levels, where m, p, and n are positive integers, comprising:

a plurality of q partial product forming devices, q being a positive integer greater than or equal to m×p, each of said partial product forming devices comprising 2n inputs for simultaneously receiving a first and second group of binary digits from said first and second plurality of groups respectively, each of said groups of said first plurality being applied to p partial product forming devices, and each of said p groups of said second plurality being applied to m different ones of said partial product forming devices, so that each of said partial product forming devices receives a first group of digits from said first plurality and a second group of digits from said second plurality;

each of said product forming devices further including combinatorial gating means which form a partial product consisting of 2n binary digits of successive significance levels;

a sum forming device having inputs connected to said outputs of said combinatorial gating means which form a complete sum of q partial products, comprising a plurality of r partial sum forming devices, each sum forming device comprising inputs for simultaneously receiving first and second groups of binary digits, each group comprising j binary digits of directly successive significance levels, both of said groups originating from at least two partial products derived from said combinatorial gating means, where r and j are positive integers;

each partial sum forming device having a further input for receiving a binary output carry signal from a partial sum forming device of next lower significance level, simultaneously with said first and second groups of binary digits;

each partial sum forming device further including j outputs for outputting the partial sum of the signals received by said partial sum forming devices, and a carry output for outputting simultaneously therewith a binary output carry signal to a partial sum forming device of next higher significance level;

an array of said partial sum forming devices cooperating with said partial product forming devices of lowest significance level in order to form the complete product in parallel.

2. A device as defined in claim 1 wherein j equals n.

3. A device for multiplying a first number having a sequence of m groups of n bits each, by a second number having a sequence of p groups of n bits each, wherein p, m<3 and n<2, said device comprising:

a first array of partial product forming devices, each receiving one of said m groups and one of said p groups of said first and second numbers respectively;

each of m×p partial product forming devices thereby receiving a different combination of two n-bit groups;

each partial product forming device having means for forming by combinatorial gating, from two bit groups received a partial product of 2n bits;

said device furthermore comprising:

a second array for receiving and accumulating said partial products;

said second array comprising:

r partial sum forming devices, each receiving within said partial products two second sequences of j bits of corresponding significance levels among said second sequences and a binary carry input signal and for thereupon generating a partial sum consisting of a third sequence of j bits and a binary carry output signal, the total complement of said second sequences encompassing all partial products formed by said first array exclusive of the least significant thereof;

said second array having for each significance level of the bits received a column of at least two interconnected partial sum forming devices for generating by successive addition of said second and third sequences inclusive of any output carry signal so generated a single final product bit, the total complement of final product bits so generated together with the least significant of said partial products constituting the final product.

4. The device as claimed in claim 3, wherein:

for at least one significance level, at least four partial sum forming devices are connected thereto, whereby at least one of said partial sum forming devices has two groups of j inputs exclusively connected to corresponding groups of j outputs of further partial sum forming devices of said significance level in order to form for at least one significance level a tree structure of partial sum forming devices, whereby the greatest length of any sequence of partial sum forming devices in said second array amounts to at most p+m partial sum forming devices.

5. The device of claim 3 in which j=n.

6. A device as claimed in claim 3 wherein for 2p=m, a number of at least $(2p^2+2p-3)$ of said partial product forming devices are provided.

7. A device as claimed in claim 3 wherein the partial product forming devices have a logical depth of 3 combinatory logic gates.

8. A device as claimed in claim 3 wherein said second array comprises sequences of partial sum forming devices having a greatest length of p+m partial sum forming devices.

9. A device for multiplying a first number in binary two's complement representation including a first sign bit and a sequence of m groups of n bits each having a fractional value, by a second number in binary two's complement representation including a second sign bit and a sequence of p groups of n digits each having a fractional value, wherein p,m, n>2, said device comprising:

a first array of partial product forming devices, each receiving one of said m groups and one of said n groups of said first and second numbers, respectively;

each of m×p partial product forming devices thereby receiving a different combination of two n-bit groups;

each partial product forming device having means for forming by combinatorial gating from two bit groups received a partial product of 2n bits;

said device furthermore comprising:

a second array for receiving and accumulating said partial products;

said second array comprising r partial sum forming devices for each receiving within said partial products two second sequences of j bits of corresponding significance levels among said second sequences and a binary carry input signal, and thereupon generating a partial sum consisting of a third sequence of j bits and a binary carry output signal, the total complement of said second sequences encompassing all partial products formed by the first array exclusive of the least significant thereof;

said second array having for each significance level of the bits received a column of at least two interconnected partial sum forming devices for generating, by successive addition of said second and third sequences inclusive of any output carry signals so generated, a single preliminary product bit, the total complement of preliminary product bits so generated together with the least significant of said partial products constituting a preliminary product;

means for multiplying the first sign bit with the bitwise inverted contents of said p groups of n bits to form a first correction bit sequence;

means for multiplying the second sign bit with the bitwise inverted contents of said m groups of n bits to form a second correction bit sequence;

further adding means for adding said preliminary product and said first and second correction bit sequences to form a final product; and sign bit determining means being provided for multiplying said first and second sign bits.

10. The device as claimed in claim 9, wherein:

for at least one significance level, at least four partial sum forming devices are connected thereto, whereby at least one of said partial sum forming devices has two groups of j inputs exclusively connected to corresponding groups of j outputs of further partial sum forming devices of said significance level in order to form for at least one significance level a tree structure of partial sum forming devices, whereby the greatest length of any sequence of partial sum forming devices in said second array amounts to at most p+m partial sum forming devices.

11. The device of claim 9 in which j=n.

12. A device as claimed in claim 9 wherein said second array and said further adding means are made of similar partial sum forming devices.

13. A device as claimed in claim 9 wherein for 2p=m, a number of at least $(2p^2+2p-3)$ of said partial product forming devices are provided.

14. A device as claimed in claim 9 wherein the partial product forming devices have a logical depth of three combinatory logic gates.

15. A device as claimed in claim 9 wherein said second array and said further adding means are combined to form a single array which thus comprises sequences of partial sum forming devices having a greatest length of p+m partial sum forming devices.

* * * * *